Nov. 21, 1950 H. HANSEN 2,530,961
STEPPING DEVICE
Filed July 19, 1947
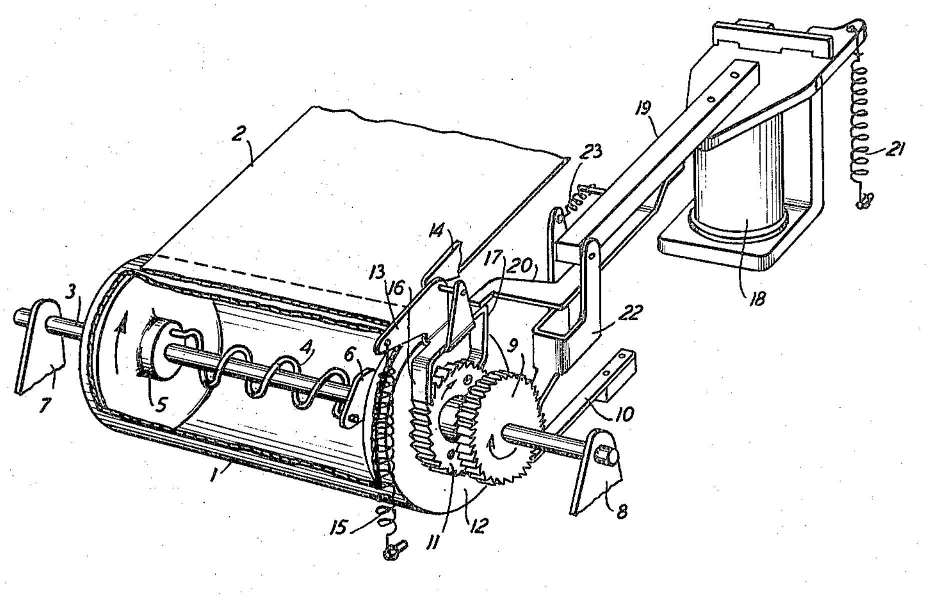
INVENTOR
H. HANSEN
BY R. Marino
ATTORNEY Patented Nov. 21, 1950 2,530,961

UNITED STATES PATENT OFFICE 2,530,961

STEPPING DEVICE

Harry Hansen, Clifton, N. J., assignor to Bell Telephone Laboratories, Incorporated, New York, N. Y., a corporation of New York Application July 19, 1947, Serial No. 762,093

1 Claim. (Cl. 271—2.4)

This invention relates to recording devices and particularly to recorders in which record information is recorded in successive lines on the record medium.

In most recording devices, the record medium is held stationary while characters are being impressed on it and then rapidly advanced to a position for impressing another character or a group of characters. Generally, the record medium, in the form of a tape or card, is advanced by a drum which supports the record medium and rotates in successive steps. Where the tape or card is narrow, the drum may be small and light and a simple ratchet mechanism for stepping the drum is satisfactory. Where, however, a wide tape or card is used, the drum is, of necessity, large and has considerable inertia. The drum, therefore, tends to overthrow when stepped rapidly, there is difficulty in accurately positioning it to receive the impressions, and the stepping mechanism is soon worn out.

An object of the present invention is to provide a reliable mechanism for stepping the drum that will position the drum accurately for the successive impressions.

Another object of the invention is a mechanism that can be satisfactorily operated at high speed.

These and other objects of the invention will be apparent from the description, the appended claim, and the drawing which shows a perspective view of a mechanism constructed in accordance with the invention.

In the drawing only so much of the mechanism of the recorder is shown as is necessary for a clear understanding of the invention. A recorder of the type to which the invention is particularly applicable is disclosed in the copending application of W. W. Carpenter, Serial No. 588,401, filed April 14, 1945. Reference may be had to said application for a more complete understanding of the construction and operation of the parts of the recorder not shown herein.

The drum 1, which is shown broken away to display its interior, is adapted to carry the record medium 2 and to advance said medium, when the drum is rotated, either by friction or by means of lugs (not shown) on the drum which engage perforations in said medium or by other suitable means. The drum 1 turns freely on the shaft 3 but is connected to said shaft by a torsion spring 4, one end of which engages the hub 5 of drum 1 and the other end of which engages the lug 6 fixed to shaft 3. The spring 4 is placed with an initial tension which tends to turn drum 1 in the direction of the arrow with respect to shaft 3, which is supported by and turns freely in the brackets 7 and 8. A ratchet 9 is fixed to shaft 3 and its teeth are engaged by a spring pawl 10 mounted on the framework of the machine. A second ratchet 11 is fixed to the hub 12 of drum 1 with its teeth pointing in the opposite direction to the teeth of ratchet 9. A double pawl 13 is pivoted on a bracket 14 extending from the framework of the machine. A spring 15 tends to hold the front pawl 16 of said double pawl in engagement with the teeth of ratchet 11 and the rear pawl 17 of said double pawl clear of said teeth.

A magnet 18, for stepping the drum 1, has an arm 19 fixed to its armature and said arm carries a finger 20 adapted to engage the rear pawl 17 of the double pawl 13, said finger being normally held clear of the double pawl 13 by the spring 21 operating on the armature of the magnet 18. Pivoted to the end of arm 19 is another pawl 22 held in engagement with the teeth of ratchet 9 by the spring 23.

By the initial tension of spring 4, a tooth of ratchet 11 is held in engagement with the front pawl 16 of the double pawl 13 while a tooth of ratchet 9 is held in engagement with spring pawl 10. When magnet 18 is energized, depressing arm 19, ratchet 9 is rotated by pawl 22 until a new tooth of ratchet 9 engages the spring pawl 10, thereby rotating shaft 3 and further winding up spring 4. The finger 20 also depresses the rear pawl 17 of the double pawl 13, raising the front pawl 16 of said double pawl clear of the teeth of ratchet 11. The tension of spring 4 then causes drum 1 to rotate in the direction of the arrow until it is arrested by a tooth of ratchet 11 engaging the rear pawl 17 of the double pawl 13.

When magnet 18 is deenergized, the arm 19 is lifted by the spring 21, the pawl 22 riding over the teeth of ratchet 9 to engage a new tooth of said ratchet. The double pawl 13 now freed by the lifting of finger 20, is drawn toward its normal position by the spring 15. When the rear pawl 17 of the double pawl 13 is thus withdrawn from engagement with the tooth of ratchet 11, drum 1 is again rotated by spring 4 until arrested by a tooth of ratchet 11 engaging the front pawl 16 of the double pawl 13.

Each time magnet 18 is energized and each time said magnet is deenergized, the drum 1 thus makes a discrete step. If the spacing of the teeth of ratchet 11 is uniform, said steps may be made equal by suitable spacing of the two pawls 16 and 17 of the double pawl 13 so that the movement of the drum at each step thereof is one-half of the spacing of the teeth of ratchet 11. The distance the record medium 2 is advanced at each step of drum 1 is determined by the diameter of said drum and the spacing of the teeth of ratchet 11. Between steps, drum 1 is firmly held by the tension of spring 4 and positioned by the engagement of one or the other of the pawls of the double pawl 13 with a tooth of ratchet 11. The magnet 18 only winds the spring 4 and does not have to overcome the inertia of the drum 1 and the record medium 2. To maintain the tension of spring 4, the ratchet 9 should have the same number of teeth as the ratchet 11.

While the magnet 18 is a convenient means for actuating arm 19, it is obvious that other suitable means, such as a rotating cam and a follower, can be used to impart the necessary motion to arm 19.

What is claimed is:

A device for feeding a record in discrete steps, comprising in combination, a record-feed drum rotatively mounted on a rotatable shaft, a torsion spring one end of which is fixed to said drum and the other end of which is fixed to said shaft, said spring being pretensioned to urge said drum to rotate in one direction and said shaft to rotate in the opposite direction, a first ratchet wheel fixed to said shaft, a second ratchet wheel fixed to said drum, said second ratchet wheel having the same number of teeth as said first ratchet wheel and oppositely disposed in relation thereto, a retaining pawl and an operating pawl each in operative engagement with said first ratchet wheel, a pivoted member having two pawls adapted to engage the teeth of said second ratchet wheel alternately, and a single electromagnet for actuating said operating pawl to rotate said first ratchet wheel and said shaft fixed thereto one tooth of said first ratchet wheel thereby to increase the tension in said spring, and for simultaneously actuating said pivoted member to permit said second ratchet wheel and said drum fixed thereto to be rotated by said spring one tooth of said second ratchet wheel in two discrete steps.

HARRY HANSEN.

REFERENCES CITED

The following references are of record in the file of this patent:

UNITED STATES PATENTS

| Number | Name | Date |
|---|---|---|
| 431,784 | Scott | July 8, 1890 |
| 1,188,875 | Allard | June 27, 1916 |
| 2,030,411 | Spaloss | Feb. 11, 1936 |